UNITED STATES PATENT OFFICE.

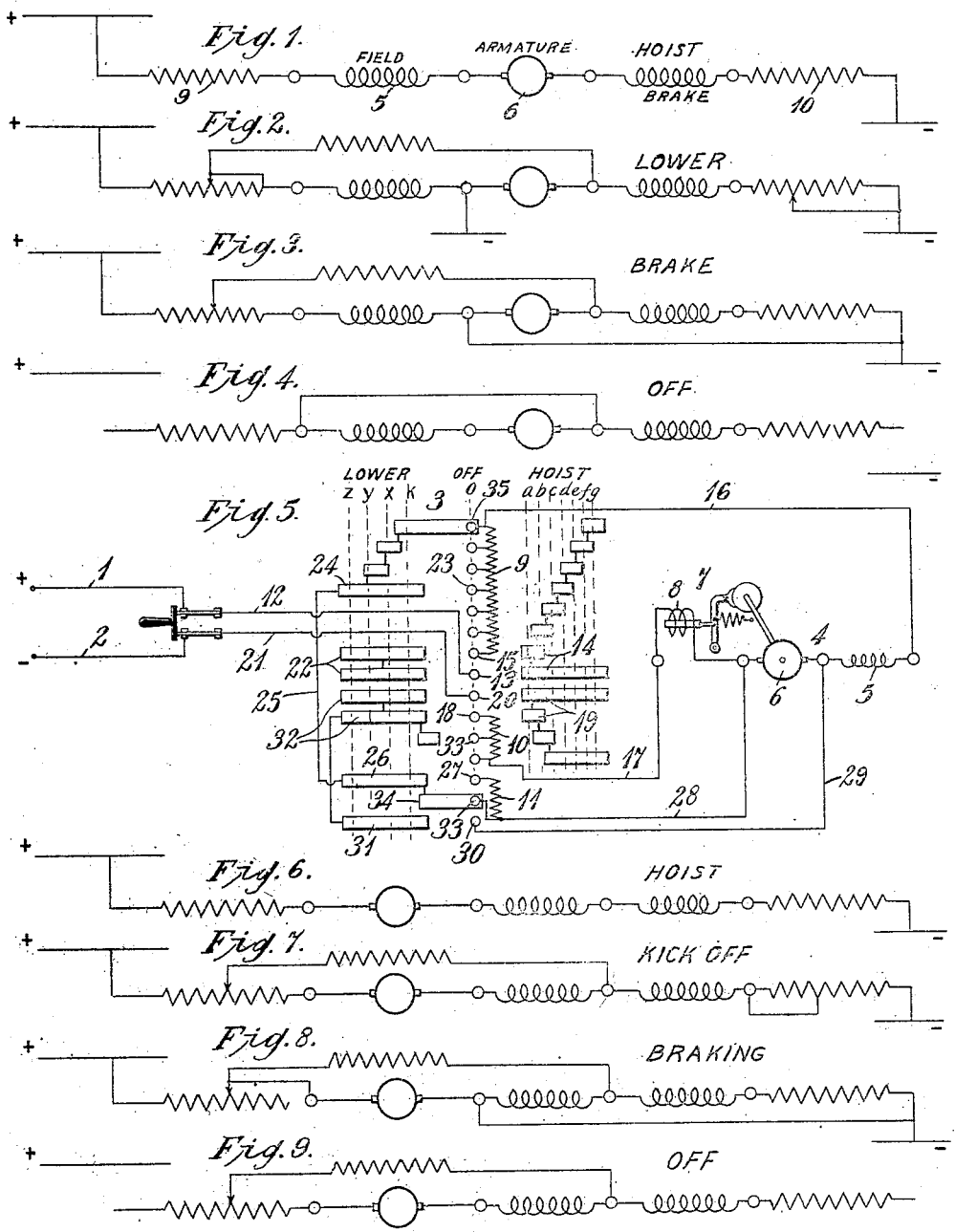

RICHARD J. DEARBORN, OF WILKINSBURG, PENNSYLVANIA, ASSIGNOR TO WESTINGHOUSE ELECTRIC AND MANUFACTURING COMPANY, A CORPORATION OF PENNSYLVANIA.

CONTROL SYSTEM FOR ELECTRIC MOTORS.

1,175,346.   Specification of Letters Patent.   Patented Mar. 14, 1916.

Application filed July 17, 1912. Serial No. 710,098.

*To all whom it may concern:*

Be it known that I, RICHARD J. DEARBORN, a citizen of the United States, and a resident of Wilkinsburg, in the county of Allegheny and State of Pennsylvania, have invented a new and useful Improvement in Control Systems for Electric Motors, of which the following is a specification.

My invention relates to controllers for electric motors and it has special reference to such controllers as are adapted to govern the motors of cranes or hoists.

One of the objects of my invention is to provide a controller of the class above indicated that shall be relatively simple in arrangement and embody the armature and field magnet windings of a series motor and the release of a mechanical brake permanently connected together.

Another object of my invention is to provide a controller which shall establish, with a relatively few number of moving contacts, such additional circuit connections between the above specified interconnected parts, as not only to enable the motor to either hoist or lower its load or to act as a generator to retard the load, but also to enable the mechanical brake to be applied without interrupting the regenerative braking circuit of the motor.

In the accompanying drawings, Figures 1, 2, 3 and 4 are simple diagrams illustrating the different circuit arrangements effected by the controller of my invention, and Fig. 5 is a diagrammatic view of a complete system of electric motor control embodying my invention. Figs. 6, 7, 8 and 9 are diagrams corresponding to Figs. 1, 2, 3 and 4 of a modified arrangement which is also arranged in accordance with my invention.

Referring to Figs. 1 to 5, inclusive, electric current is supplied from any suitable source, through circuit conductors 1 and 2 and a controller 3 to an electric motor 4, having a series field magnet winding 5 and an armature 6. The motor, when deënergized, is quickly brought to rest if it is in motion, or held stationary if it is at rest, by a mechanical brake 7 which is released by coil 8 when the motor is in operation, as hereinafter pointed out.

The controller 3 is adapted to occupy an intermediate "off" position O, a plurality of "hoisting" positions $a$, $b$, $c$, $d$, $e$, $f$ and $g$ and a plurality of "lowering" positions $h$, $x$, $y$ and $z$. Resistor sections 9, 10 and 11 are associated with the controller 3, while the motor 4 and the brake 7 are intended to be mounted on the trolley or relatively movable member of a crane in order to operate the hoisting drums. Since the operator's cab is usually mounted on the body of the crane, all connections between the controller 3 and the resistor sections 9, 10 and 11, on the one hand, and the motor 4 and the brake 7, on the other hand, must be established through conductors which are stretched longitudinally of the crane body and sliding or rolling contacts which engage the stretched conductors and are mounted on the trolley of the crane.

One of the advantages of my controller arises from the fact that a comparatively few number of conductors and sliding contact members is required, while the operation of the system allows the crane to be handled in a particularly advantageous manner.

The operation and circuit connections for the system are as follows: Assuming that the controller 3 is moved to occupy the position $a$, a circuit is established from the line conductor 1, through a conductor 12, a contact finger 13, a contact member 14, a finger 15, the resistor section 9, a conductor 16, the field coil 5, the armature 6, the brake coil 8, a conductor 17, the resistor section 10, a finger 18, a contact member 19, a finger 20 and a conductor 21 to the opposite line conductor 2. Circuit connections are thus established as indicated in Fig. 1. As the controller successively occupies the positions $b$, $c$, $d$, $e$, $f$ and $g$, the resistor sections 9 and 10 are both gradually short circuited until the motor is connected directly across the circuit in series relation with the brake coil.

When energy is first supplied to the motor and to the coil of the brake, the brake is released and the motor is so operated as to hoist the load. It will be observed that the motor operates as a series motor for hoisting. If it is now assumed that it is desired to lower the load, the controller is first moved through the "off" position into the lowering position $k$. In this position, circuit connections are established as follows: from the line conductor 1, through the conductor 12, the finger 13, a pair of contact members 22, the finger 15, a portion of the resistor sections 9, a finger 23, a contact member 24, a bridging contact member 25, a contact member 26, a finger 27, the resistor section 11, a conductor 28, the armature 6, a conductor 29, a finger 30, a pair of contact members 31 and 32, the finger 20 and the conductor 21 to the opposite line conductor 2. Another circuit connection is also established, in this position, from the conductor 12, through the finger 13, the contact members 22, the finger 15, the entire resistor section 9, the conductor 16 and the field magnet winding 5 to the conductor 29, from which point, circuit is completed as before. Still another circuit is completed from the conductor 28, through the brake coil 8, the conductor 17, the resistor section 10 (a portion of which is first short circuited by the engagement of a contact finger 33 with a contact member 34), the finger 18, the contact members 32, the finger 20 and the conductor 21, as before. The circuit connections for this position are clearly shown in Fig. 2 of the drawings.

The resistor 10 is so designed as to permit sufficient energy to traverse the brake coil 8, to hold the brake in its released position, a portion of the resistor being short circuited as the controller is first moved into this position, in order to temporarily allow a relatively large current to traverse the brake coil and release the brake.

It will be observed that the armature and field magnet windings are connected in multiple circuit relation, with the armature current reversed, for lowering the load, and that the current traverses the field magnet winding in the same direction as in the "hoisting" positions of the controller. The motor accordingly operates as a shunt motor to drive the load downward. In the position $k$, however, a relatively small current is supplied to the armature, while the field magnet is strongly energized and, consequently, the motor tends to operate at a very slow speed. Accordingly, if the load on the hoist is light and it is desired to lower the hoist rapidly, the controller may be adjusted to occupy the successive positions $x$, $y$ and $z$, in which the short circuited portion of the resistor section 9 is gradually inserted into the field branch of the motor. By this means, the motor field is weakened, its speed is increased, and a larger proportion of the current is supplied to the motor armature.

When the controller occupies its "off" position, a local dynamic braking circuit is established from one terminal of the armature 6 through the conductor 28, a contact finger 33, a contact member 34, the contact member 26, the conductor 25, the contact member 24, a contact finger 35, the conductor 16 and the field magnet winding 5 to the opposite terminal of the armature. The circuit connections are clearly illustrated in Fig. 4. It is, therefore, evident that, not only in the releasing coil 8 of the brake deënergized and the mechanical brake set, but also a low-resistance local dynamic braking circuit is established which assists the mechanical brake in immediately bringing the motor to rest.

In the first lowering position $k$, the portion of the resistor section 9 which is included in the field branch of the motor circuit is short circuited and the energy supplied to the motor tends to drive the load downward at a very slow speed, as above indicated. Consequently, if the load on the hoist is sufficiently heavy, it will drive the motor at a higher speed and cause it to deliver energy to the local dynamic braking circuit, which is then established, as shown in Fig. 2.

The arrangement of parts is such that the current delivered to the local circuit from the motor armature traverses the field winding in the same direction as the energy which is supplied from the line when the load is light and, consequently, there is no danger of the field failing to build up. In fact, the direction of current in the field is the same whether the motor is operating to hoist or to lower the load or whether the motor is operating as a generator and is being driven by the load.

My invention has the advantage of permitting the setting of the mechanical brake by interrupting the circuit of the brake releasing coil without opening the dynamic braking circuit which exists in all of the "lowering" positions and in the "off" position of the controller. This is obviously impossible with systems of the same general character, heretofore proposed, in which the brake-releasing coil is included directly in the dynamic braking circuit in the lowering positions and is excluded by either temporarily breaking the dynamic braking circuit as the controller is moved into the off position or by relying solely upon the mechanical brake.

Referring to Figs. 6, 7, 8 and 9, which correspond to Figs. 1, 2, 3 and 4, the arrangement here shown is similar to that already described, with the exception that the positions of the armature and field windings are exchanged.

The operation of the system is substantially the same as before but the current in the field magnet winding is reversed in changing from hoisting to lowering, although there is no change in the direction of current in the field winding when the controller occupies its "lowering" positions and the motor changes to a generator and is driven above its normal speed by the load.

I claim as my invention:

1. A hoist or crane control system comprising an electric motor having an armature and a series field magnet winding, a brake-releasing coil included in series with the motor armature and the field magnet winding for hoisting, and a controller for connecting the motor armature, the field magnet winding and the brake-releasing coil in parallel circuits for lowering, whereby a dynamic braking circuit is established which is independent of said releasing coil.

2. A hoist or crane control system comprising an electric motor having an armature and a field magnet winding, a mechanical brake having a releasing coil, and controlling means for connecting the armature, the field magnet winding and the brake-releasing coil in parallel circuits for lowering.

3. A hoist or crane control system comprising an electric motor having an armature and a field magnet winding, a mechanical brake having a releasing coil normally connected in series with the motor, and means for establishing a dynamic braking circuit for lowering that is independent of the brake-releasing coil.

4. In a hoist or crane control system, the combination with an electric motor having an armature and a field magnet winding, and a mechanical brake having a releasing coil, said armature, field magnet winding and releasing coil being connected in series relation for hoisting, of a controller for reversing the motor and establishing a dynamic braking circuit for lowering that is independent of said releasing coil.

5. In a hoist or crane control system, the combination with an electric motor having an armature and a field magnet winding, and a mechanical brake having a releasing coil, said armature, field magnet winding and releasing coil being connected in series relation for hoisting, of a controller for connecting the armature and field magnet winding and the brake-releasing coil in parallel paths, whereby a dynamic braking circuit is established for lowering that is independent of the releasing coil.

6. In a hoist or crane control system, the combination with an electric motor having an armature and a field magnet winding, and a mechanical brake having a releasing coil normally in series with said motor, of a resistor normally in series with the releasing coil, a controller for reversing said motor, and means comprising said controller for temporarily shunting a portion of said resistor when said motor is reversed for lowering.

7. In a hoist or crane control system, the combination with an electric motor having an armature and a field magnet winding, and a mechanical brake having a releasing coil normally in series with said motor, of means comprising a controller for reversing the motor and establishing a dynamic braking circuit and for temporarily increasing the current traversing said releasing coil when said motor is reversed for lowering.

8. A hoist or crane control system comprising an electric motor having an armature and a field magnet winding, a mechanical brake having a releasing coil normally connected in series with the motor, and means for establishing a dynamic braking circuit for lowering that is independent of the brake-releasing coil and is maintained while the circuit of the said coil is interrupted.

9. A hoist or crane control system comprising an electric motor having an armature and a field magnet winding, a mechanical brake having a releasing coil, said armature and field magnet windings and releasing coil being connected in series relation for hoisting, and a controller for reversing the motor and establishing a dynamic braking circuit for lowering that is independent of the brake-releasing coil and is maintained while the circuit of the said coil is interrupted.

10. In a control system for electric motors, an electric motor, a magnetic brake having a coil in circuit with said motor, and means for supplying current to said brake coil independently of said motor circuit.

11. In a control system for electric motors, an electric motor, a magnetic brake having a coil in circuit with said motor, and an additional circuit for supplying current to said brake coil.

12. In a control circuit for electric motors, an electric motor, a magnetic brake having a releasing coil in circuit with said motor, and a circuit including a resistor for supplying current to said coil independently of said motor circuit.

13. In a control system for electric motors, an electric motor having an armature and a field winding, a magnetic brake having a releasing coil in circuit with said motor, and a controller so arranged, when in one position, as to connect said field winding in series with said armature and, when in a second position, to connect said field winding in shunt to said armature and to connect an additional circuit to said coil.

14. In a control system for electric motors, an electric motor having an armature and a field winding, a magnetic brake comprising a coil, means for connecting said field winding in a dynamic braking circuit for said motor, and means for supplying current to said coil independently of said braking circuit.

15. In a control system, the combination with an electric motor having an armature and a field winding, and a magnetic brake having a releasing coil, of a controller comprising variable resistors and so arranged as to connect said resistors in series with said armature, field winding, and said coil, when said controller is in one position, and to connect said field winding in parallel with said armature and to connect an additional circuit to said coil, when said controller is in a second position.

16. In a motor control system, the combination with an electric motor having an armature and a field winding, and a magnetic brake having a coil, of a controller so arranged, when in one position, as to connect said field winding and said armature in series with said coil and, when in a second position, to connect said field winding in parallel with said armature and to connect an additional circuit between said coil and said winding.

In testimony whereof, I have hereunto subscribed my name this 1st day of July 1912.

RICHARD J. DEARBORN.

Witnesses:
B. B. HINES,
M. C. MERZ.